United States Patent [19]

Yoshida et al.

[11] Patent Number: 4,534,982
[45] Date of Patent: Aug. 13, 1985

[54] PROCESS FOR PRODUCING CREAM CHEESE TYPE FOOD

[75] Inventors: Hideaki Yoshida, Sennan; Hayato Kubota, Izumi, both of Japan

[73] Assignee: Fuji Oil Company, Limited, Osaka, Japan

[21] Appl. No.: 468,280

[22] Filed: Feb. 22, 1983

[30] Foreign Application Priority Data

Oct. 27, 1982 [JP] Japan ................................. 57-189743

[51] Int. Cl.$^3$ ................................................ A23C 9/12
[52] U.S. Cl. ........................................ 426/36; 426/34; 426/38; 426/39; 426/40; 426/41; 426/42
[58] Field of Search .......................... 426/36, 38, 42, 43

[56] References Cited

U.S. PATENT DOCUMENTS 3,929,892 12/1975 Hynes et al. ............................ 426/36
4,343,817  8/1982 Swanson et al. ...................... 426/36
4,379,175  4/1983 Baker .................................... 426/38

Primary Examiner—Sam Rosen
Attorney, Agent, or Firm—Wenderoth, Lind & Ponack

[57] ABSTRACT

A process for producing a cream cheese type food resembled to natural cream cheese, which comprises the steps of:
(a) homogenizing and pasteurizing an aqueous mixture of an aqueous dispersion containing non-fat milk solid, a fat or oil and an emulsifier to prepare a cream mix;
(b) adding a lactic ferment starter and rennet to the cream mix to ferment the resulting mixture;
(c) terminating the lactic fermentation by heating the fermented mixture to 75° to 85° C.;
(d) separating and draining whey from the fermanted mixture to obtain a curd;
(e) adding a stabilizer and salt to the curd, heating the resulting mixture to 70° to 85° C. and kneading the mixture with stirring at a rate of 200 to 1,000 r.p.m. in a closed system; and then
(f) homogenizing and cooling the mixture.

10 Claims, No Drawings

PROCESS FOR PRODUCING CREAM CHEESE TYPE FOOD

The present invention relates to a process for producing a cream cheese type food. More particulary, it relates to an artificial or imitation cream cheese of good quality having smooth texture and excellent spreadability.

Cream cheese is one kind of unripened type of natural cheese which is produced by diluting fresh cream with milk, skimmed milk, etc. to obtain a diluted cream containing 8 to 9% of non-fat milk solid and 10 to 11% of milk fat, adding a lactic ferment starter and rennet to the diluted cream, fermenting the resulting mixture, separating and draining whey from the fermented mixture to obtain a curd, adding salt to the curd and then mixing them. Since cream cheese has a mild cheese flavor in comparison with ripened type natural cheese, cream cheese suits a variety of tastes and its consumption increases every year.

On the other hand, raw materials, particularly, fat ingredients of natural cream cheese are derived from animal sources and, from nutritional and health viewpoints, it is desired to substitute materials derived from vegetable sources for these animal materials.

Under these circumstances, recently, artificial or imitation cream cheeses using vegetable fats or oils as fat ingredients thereof have been proposed. However, an artificial or imitation cream cheese having sufficient quality to be comparable with natural cream cheese has not yet obtained. For example, Japanese Patent Publication (unexamined) No. 22,645/1982 discloses a process for producing a cream cheese type food which comprises adding a starter and rennet to an aqueous mixture of casein, a vegetable fat or oil, an emulsifier, lactose, a calcium salt and an orthophosphate, fermenting the mixture, terminating the lactic fermentation at pH 5.4 to 5.9 and then, adding glucono delta lactone and a stabilizer to the fermented mixture. However, this process is substantially different from standard cream cheese making since, in this process, the lactic fermentation is terminated at a higher pH range than that in standard cream cheese making and whey separation is not included. Therefore, physical properties as well as taste and flavor of the product obtained by this process are different from those of natural cream cheese.

The present inventors have surprisingly found that a cream cheese type food of good quality which resembles natural cream cheese can be produced by using skimmed milk or readily commercially available skimmed milk powder as a protein source and combining specific process conditions in the production of an artificial or imitation cream cheese. It has hitherto been said that, when skimmed milk powder is used in production of cream cheese, it adversely effects micelle formation of casein during preparation of a mixture of raw materials (cream mix) before the fermentation step since whey protein of skimmed milk powder is denatured by a heat treatment during production of skimmed milk powder itself and hence, the quality of cheese produced is deteriorated. In fact, according to the present inventors' experiments (see Reference Examples hereinafter), when skimmed milk powder is used, the product has inferior binding capacity and crumbles and hence, a texture having viscoelasticity which is comparable with natural cream cheese can not obtained. Further, this state can not be sufficiently improved even by addition of a stabilizer such as a gum, etc. and/or an agent for dissolving protein such as a phosphate, etc. and, when an increased amount of these additives are added, undesirable viscosity is produced. On the contrary, according to the present invention, even if skimmed milk powder is used, a cream cheese type food of good quality having smooth texture and excellent spreadability can be obtained.

The main object of the present invention is to provide a process for producing a cream cheese type food of good quality being comparable with natural cream cheese which utilizes skimmed milk or skimmed milk powder as a protein source and a vegetable fat or oil as a fat ingredient. This object as well as other objects and advantages of the present invention will become apparent to those skilled in the art from the following description.

According to the present invention, there is provided a process for producing a cream cheese type food, which comprises the steps of:

(a) homogenizing and pasteurizing an aqueous mixture of an aqueous dispersion containing non-fat milk solid, a fat or oil and an emulsifier to prepare a cream mix;

(b) adding a lactic ferment starter and rennet to the cream mix to ferment the resulting mixture;

(c) terminating the lactic fermentation by heating the fermented mixture to 75° to 85° C.;

(d) separating and draining whey from the fermented mixture to obtain a curd;

(e) adding a stabilizer and salt to the curd, heating the resulting mixture to 70° to 85° C. and kneading the mixture with stirring at a rate of 200 to 1,000 r.p.m. in a closed system; and then (f) homogenizing and cooling the mixture.

In step (a) of the process of the present invention, a cream mix is prepared by mixing an aqueous solution or dispersion containing non-fat milk solid, a fat or oil, and an emulsifier to obtain an aqueous mixture and then, either homogenizing the aqueous mixture followed by pasteurization or pasteurizing the aqueous mixture followed by homogenization.

As the aqueous solution or dispersion containing non-fat milk solid, there can be used skimmed milk or an aqueous dispersion of skimmed milk powder. Any commercially available skimmed milk or skimmed milk powder can be used. In case of using skimmed milk, it is important to check its quality, particularly, taste and flavor and to avoid using skimmed milk having off-taste and off-odor. In case of using skimmed milk powder, it is preferable to use that produced by spray-drying at a temperature as low as possible.

As the fat or oil, from nutritional and health viewpoints, as mentioned above, it is preferable to use a vegetable fat or oil. For example, rapeseed oil soy bean oil, sunflower seed oil, cotton seed oil, peanut oil, rice oil, corn oil, safflower oil, olive oil, kapok oil, palm oil, coconut oil, palm kernel oil or a mixture thereof can be used. Further, a hardened, fractionated or transesterified oil derived from the above vegetable oil or a mixture thereof can be also used and the oil having melting point of 20° to 35° C. is preferred. Particularly, it is preferable to use rapeseed oil or a fat or oil derived from rapeseed oil. Optionally, an oil-soluble colorant such as β-carotene or annatto and/or a flavor such as butter flavor, cream flavor or milk flavor can be added to the fat or oil prior to use.

As the emulsifier, there can be used, for example, a propylene glycol fatty acid ester, a polyglycerol fatty acid ester, a sorbitan fatty acid ester, a glycerin fatty acid ester, lecithin, etc. These emulsifiers can be used alone or in combination thereof. Particularly, it is preferable to use a propylene glycol fatty acid ester.

In general, the preparation of the cream mix in step (a) is carried out by adding 9 to 12 parts by weight of the fat or oil to which 0.1 to 2 parts by weight of the emulsifier has been added to either 88 to 91 parts by weight of skimmed milk or a mixture of 8 to 10 parts by weight of skimmed milk powder and 78 to 83 parts by weight of water, heating the resulting mixture to 65° to 70° C., stirring the mixture at high speed to pre-emulsify the mixture and then homogenizing and pasteurizing the mixture. Heating at 80° to 90° C. for about 2 minutes is sufficient for the pasteurization of the mixture. It is preferable to effect the pre-emulsification followed by the pasteurization and then the homogenization, but the homogenization can be effected prior to the pasteurization. Preferably, the homogenization is effected under a pressure of 50 to 200 kg/cm$^2$ so that 30% or more of fat globules in the mixture have particle size of 0.4μ or less. It is preferable that the cream mix thus obtained is quickly cooled to about 20° C.

In the step (b), a lactic ferment starter and a small amount of rennet are added to the cream mix obtained in the step (a) and lactic fermentation is effected.

As the starter, there can be used a lactic acid bacterium which is used in conventional lactic fermentation for example, that of Streptococcus or Leuconostoc such as *Streptococcus lactis*, *Streptococcus cremoris*, *Streptococcus diacetyllactis*, *Leuconostoc cremoris*, *Betacoccus cremoris*, etc. These lactic acid bacteria can be used alone or in the combination thereof. One or more of these lactic acid bacteria are inoculated into, for example, 10% aqueous dispersion of skimmed milk powder to prepare a bulk starter and the bulk starter is added to the cream mix in an amount of 0.1 to 5% by weight based on the cream mix.

Rennet in the form of a liquid preparation a powder preparation or a tablet is commercially available and, in the present invention, a commercially available rennet can be used as is or diluted with sterilized water prior to use. Usually, the activity of liquid rennet is 1:10,000 to 15,000 (The activity is expressed by the number of volume (cc) of milk coagulated by 1 cc of the rennet preparation at 35° C. for 40 minutes). Usually, rennet is added to the cream mix in an amount of 1 to 50 ppm. It is very effective to add calcium chloride as a calcium reinforcing agent for formation of a curd to the cream mix in an amount of about 20 ppm at the same time of addition as the rennet.

Usually, the lactic fermentation is carried out at 19° to 23° C. for 12 to 18 hours until the fermented mixture reaches pH 4.6 to 5.0.

In step (c), the fermentation is terminated by heating the fermented mixture having the desired pH value. In the present invention, the heating conditions for terminating the fermentation are very important.

That is, in general, heating at 50° to 60° C. is sufficient for pasteurizing lactic acid bacteria. However, when heating is effected at such a temperature, whey protein is drained away in the next whey separation step. In the present invention, it is important to keep whey protein in a curd and, therefore, heating is effected at 75° to 85° C. for 30 to 60 minutes to denature whey protein. Thereby, whey protein is recovered and kept in curd form. This is one of the characteristic aspects of the present invention.

In step (d), whey is separated and drained from the fermented mixture which has been heated to form a curd. Whey separation can be carried out by using a conventional separator according to a known method.

In step (e), a stabilizer and salt are added to the curd thus obtained and then the resulting mixture is heated and kneaded.

As the stabilizer, there can be used a gum such as locust bean gum, guar gum or xanthan gum, a cellulose derivative such as carboxymethylcellulose, etc.

Usually, 0.1 to 1.0% by weight of the stabilizer and 0.1 to 2.0% by weight of salt are added to the curd. Optionally, a water-soluble flavor such as butter flavor, cream flavor or milk flavor and/or a water-soluble colorant such as water-soluble β-carotene can be further added to the curd.

The resulting mixture as the curd and the other additives is heated at 70° to 85° C. before kneading or at the same time as kneading. For example, the mixture can be heated with stirring at about 70° C. for 30 to 40 minutes before kneading or, preferably, as mentioned hereinafter, the mixture can be heated and kneaded at 75° to 85° C. for 2 to 3 minutes with stirring at high speed.

In the present invention, in order to obtain a product having good texture, kneading conditions are also very important and are another characteristic aspect of the present invention. That is, in order to minimize air entrapment, kneading is carried out in a closed system by stirring the mixture at 200 to 1,000 r.p.m. However, such stirring that the mixture is pressed against a wall surface of a kneading container should be avoided and it is preferable to use a tubular heat exchanger having a scraper therein such as the A unit of Votator (manufactured by Votator Division, Chemetron Corp., U.S.A.) or Onrator (manufactured by Sakura Seisakusho, Japan). For example, good texture having viscoelasticity can be obtained by stirring the mixture at 200 to 1,000 r.p.m. at 75° to 85° C. for 2 to 3 minutes in a closed system apparatus comprising a hollow cylindrical tube having a jacket on the perimeter thereof through which hot water is passed and a paddle scraper rotating in the tube to knead the mixture.

Step (f) is the final step in which the kneaded mixture is again homogenized and cooled.

Since, after treatment in the previous kneading step, the emulsion state of the mixture becomes unstable, the mixture is again fully emulsified by this homogenization Homogenization under a pressure of 50 to 150 kg/cm$^2$ is sufficient for this purpose. By this homogenization, separation of the fat ingredient can be prevented and smoothness of the texture is improved.

The homogenized mixture is optionally packed in a container. Then, the homogenized mixture is quickly cooled to 3° to 10° C. according to a known method to obtain the cream cheese type food of the present invention.

Besides, it is preferable to carry out the homogenization and packing in a closed system. The packing can be carried out after cooling. As the container, there can be used, for example, an individual package such as a tube of plastic film or various cup containers. The packing can be carried out according to a known method.

In general, the cream cheese type food of the present invention thus obtained is composed of 50 to 55% by weight of water, 31 to 35% by weight of fat, 9 to 12% by weight of protein, 2 to 4% by weight of carbohydrate and 0.3 to 0.5% by weight of ash and has good quality resembling to natural cream cheese.

The following examples and reference examples further illustrate the present invention in detail but are not to be construed to limit the scope thereof. In the examples and reference examples, all "parts" and "percentages" are by weight unless otherwise stated.

EXAMPLE 1

Lecithin (0.5 parts), butter flavor (0.02 part) and β-carotene (0.001 part) were added to a hardened rapeseed oil having melting point of 31.2° C. (10 parts) while the hardened oil was warming at 60° C . and the additives were dissolved in the hardened oil with stirring to prepare an oil phase.

Separately, an aqueous phase was prepared by gradually adding skimmed milk powder (8 parts) to water (82 parts) maintained at about 50° C. with stirring by a homomixer.

The above-prepared oil phase was added to the aqueous phase and the mixture was pre-emulsified by stirring at high speed at 65° C. The pre-emulsified mixture was homogenized under the pressure of 120 kg/cm$^2$ by a homogenizer, pasteurized at 90° C. for 2 minutes and then cooled to 20° C. to prepare a cream mix containing 10% of fat (step (a)).

To the cream mix thus obtained (100 parts) were added a bulk starter (0.5 part, prepared by inoculating a lactic acid bacteria mixture (*Streptococcus cremoris:-Betacoccus cremoris*=95:5) in 10% aqueous dispersion of skimmed milk powder and cultivating at 23° C. for 15 hours), rennet (5 ppm) and calcium chloride (20 ppm) and the mixture was fermented at 20° C. for 16 hours (pH 4.74, step (b)).

The fermented mixture was heated at 80° C. for 30 minutes to terminate fermentation (step (c)).

The mixture thus fermented and heated was treated by a centrifugal separator at 7,500 r.p.m. to separate and drain whey to obtain a curd (step (d)).

To the curd thus obtained (35 parts) were added locust bean gum (0.3 part), salt (0.8 part) and water-soluble butter flavor (0.05 part) and the mixture was stirred in a jacketed closed system cylindrical type paddle kneader at 80° C. for 3 minutes to effect kneading and pasteurization (step (e)).

Then, the kneaded mixture was homogenized under the pressure of 100 kg/cm$^2$ and led to a filler. Each predetermined amount of the mixture was packed in a tube of plastic film, sealed and quickly cooled to 5° C. (step (f)).

The product thus obtained was composed of 53.2% of water, 33.8% of fat, 9.3% of protein, 3.2% of carbohydrate and 0.4% of ash. The product was a cream cheese type food comparable to natural cream cheese since it had smooth texture and moderate viscoelasticity and palatably melted in the mouth without stickiness.

EXAMPLE 2

According to the same procedure as described in Example 1, a cream mix obtained by admixing an oil phase prepared from a hardened soy bean oil having melting point of 30.7° C. (11 parts), lecithin (0.2 part), polyglycerin condensed ricinoleate (0.5 part), butter flavor (0.02 part) and β-carotene (0.001 part) and an aqueous phase prepared from water (79.5 parts) and skimmed milk powder (9.5 parts), homogenizing the resulting mixture under the pressure of 180 kg/cm$^2$, pasteurizing the mixture at 80° C. for 2 minutes and cooling to 21° C.

To the cream mix were added a bulk starter (0.5 part, prepared by inoculating a lactic acid bacterium mixture (*Streptococcus lactis:Streptococcus diacetyllactis:Betacoccus cremoris*=60 to 70:5 to 10:25 to 30) in 10% aqueous dispersion of skimmed milk powder and cultivating at 23° C. for 15 hours), rennet (5 ppm) and calcium chloride (20 ppm) and the mixture was fermented at 21° C. for 14 hours (pH 4.68). The fermented mixture was heated at 80° C. for 30 minutes to terminate fermentation.

Then, the mixture was treated according to the same procedure as in Example 1 to obtain a product composed of 55.0% of water, 31.8% of fat, 9.2% of protein, 3.5% of carbohydrate and 0.5% of ash.

The product thus obtained had good texture resembling to natural cream cheese and exhibited excellent spreadability when it was spread on bread.

REFERENCE EXAMPLE 1

According to the same procedure as in Example 1, a cream cheese type food was obtained except that fermentation was terminated by heating the mixture at 65° C.

REFERENCE EXAMPLE 2

According to the same procedure as in Example 1, a cream cheese type food was obtained except that kneading was effected by using a vertical mixer at the rate of stirring of 180 r.p.m.

Although the product of Reference Example 1 had better quality than that of Reference Example 2, kneading could not fully exert its effect on formation of texture and hence, its texture showed inferior binding capacity and was crumbly. In the product of Reference Example 2, kneading was insufficiently effected and hence, its texture lacked smoothness and was crunchy, tough and lumpy.

EXAMPLE 3

According to the same procedure as described in Example 1, a cream mix was obtained by admixing an oil phase prepared from a hardened rapeseed oil having melting point of 31.2° C. (9 parts), lecithin (0.4 part), propylene glycol stearate (0.2 part), butter flavor (0.02 part) and β-carotene (0.001 part) and as an aqueous phase skimmed milk (91 part), homogenizing the resulting mixture under the pressure of 140 kg/cm$^2$, pasteurizing the mixture at 90° C. for 2 minutes and cooling to 20° C.

To the cream mix were added a bulk starter as in Example 1 (0.5 part), rennet (5 ppm) and calcium chloride (20 ppm) and the mixture was fermented at 20° C. for 16 hours (pH 4.65). The fermented mixture was heated at 80° C. for 30 minutes to terminate fermentation.

Then, the mixture was treated according to the same procedure as in Example 1 to obtain a product composed of 54.0% of water, 33.2% of fat, 9.7% of protein, 2.7% of carbohydrate and 0.3% of ash.

The product thus obtained had good and smooth texture resembling to natural cream cheese, moderate viscoelasticity and excellent spreadability and was convenient to use.

REFERENCE EXAMPLE 3

According to the same procedure as in Example 3, a cream cheese type food was obtained except that fermentation was terminated by heating the mixture at 65° C. and kneading was effected according the same procedure as in Reference Example 2.

Similar to the product of Reference Example 2, in the product of Reference Example 3, kneading was insufficiently effected and hence, its texture lacked in smoothness and was crunchy and tough.

What is claimed is:

1. A process for producing a cream cheese type food, which comprises the steps of:
   (a) homogenizing and pasteurizing an aqueous mixture of an aqueous dispersion containing non-fat milk solid, a fat or oil and an emulsifier to prepare a cream mix;
   (b) adding a lactic ferment starter and 1 to 50 ppm of rennent to the cream mix to ferment the resulting mixture for 12 to 18 hours;
   (c) terminating the lactic fermentation by heating the fermented mixture to 75° to 85° C.;
   (d) separating and draining whey from the fermented mixture to obtain a curd;
   (e) adding a stabilizer and salt to the curd, heating the resulting mixture to 70° to 85° C. and kneading the mixture with stirring at a rate of 200 to 1,000 r.p.m. in a closed system; and then
   (f) homogenizing and cooling the mixture.

2. A process according to claim 1, wherein the aqueous dispersion containing non-fat milk solid is skimmed milk or an aqueous dispersion of skimmed milk powder.

3. A process according to claim 1, wherein the fat or oil is a member selected from the group consisting of rapeseed oil, soy bean oil, sunflower seed oil, cotton seed oil, peanut oil, rice oil, corn oil, safflower oil, olive oil, kapok oil, palm oil, coconut oil, palm kernel oil, a hardened, fractionated or transesterified oil derived from these oils and a mixture thereof.

4. A process according to claim 3, wherein the fat or oil is a member selected from rapeseed oil or hardened, fractionated or transesterified rapeseed oil.

5. A process according to claim 1, wherein the emulsifier is a member selected from the group consisting of a propylene glycol fatty acid ester, a polyglycerol fatty acid ester, a sorbitan fatty acid ester, a glycerin fatty acid ester, lecithin and a mixture thereof.

6. A process according to claim 1, wherein the lactic fermentation of the step (b) is carried out at 19° to 23° C. for 12 to 18 hours until the fermented mixture reaches pH 4.6 to 5.0.

7. A process according to claim 1, wherein the heating of the step (c) is effected at 75° to 85° C. for 30 to 60 minutes.

8. A process according to claim 1, wherein the stabilizer is a member selected from the group consisting of locust bean gum, guar gum, xanthan gum and carboxymethylcellulose.

9. A process according to claim 1, wherein the step (f) is carried out in a closed system.

10. A process according to claim 1, wherein the cream cheese type food is produced by the steps of:
   (a) preparing a cream mix by adding a mixture of 9 to 10 parts by weight of the fat or oil and 0.1 to 2 parts by weight of the emulsifier to either 88 to 91 parts by weight of skimmed milk or an aqueous mixture of 8 to 10 parts by weight of skimmed milk powder and 78 to 83 parts by weight of water, pasteurizing the resulting mixture at 80° to 90° C. for about 2 minutes and homogenizing the mixture under a pressure of 50 to 200 kg/cm$^2$;
   (b) adding 0.1 to 5 parts by weight of the lactic ferment starter, 1 to 50 ppm of rennet and about 20 ppm of calcium chloride to the cream mix and fermenting the resulting mixture at 19° to 23° C. to bring the mixture to pH 4.6 to 5.0;
   (c) heating the fermented mixture at 75° to 85° C. for 30 to 60 minutes to terminate the lactic fermentation;
   (d) separating and draining whey from the fermented mixture to obtain the curd;
   (e) adding 0.1 to 1.0% by weight of the stabilizer and 0.1 to 2.0% by weight of salt to the curd and kneading the resulting mixture with stirring at a rate of 200 to 1,000 r.p.m. in a closed system at 75° to 85° C. for 2 to 3 minutes; and then
   (f) homogenizing the mixture under a pressure of 50 to 150 kg/cm$^2$ in a closed system, packing in a container and cooling to 3° to 10° C.

* * * * *